United States Patent Office 2,883,400
Patented Apr. 21, 1959

2,883,400

1-DEHYDRO-11-KETO PROGESTERONE

Samuel H. Eppstein, Galesburg, and Peter D. Meister, Kalamazoo Township, Kalamazoo County, Mich., and Adolph Weintraub, Brooklyn, N.Y., assignors to The Upjohn Company, Kalamazoo, Mich., a corporation of Michigan No Drawing. Application November 2, 1956
Serial No. 619,952

1 Claim. (Cl. 260—397.3)

The invention relates to a new chemical compound, 1-dehydro-11-ketoprogesterone (1,4 - pregnadiene-3,11,20-trione), which compound possesses valuable glucocorticoid and anti-inflammatory activity.

This application is a continuation-in-part of application S.N. 493,302, filed March 9, 1955, now abandoned.

The compound of this invention has the following structural formula:

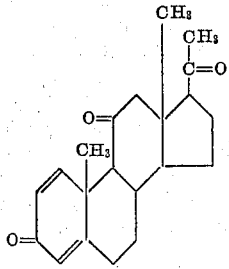

The compound is useful also as a starting material for the preparation of 1-dehydrohydrocortisone and 1-dehydrocortisone, using only microbiological conversion steps. For example, it is readily convertible by the method disclosed by Ch. Meystre, E. Vischer, and A. Wettstein, Helv. Chim. Acta, 37, 1548 (1954) to the 21-hydroxylated product, 21 - hydroxy - 1,4 - pregnadiene - 3,11,20-trione, i.e., by fermentation with 21-hydroxylated microorganisms such as Ophiobolus herpotrichus. This latter compound is readily converted, without isolation from the organism-free beer if desired, to 1-dehydrocortisone by the process of P. D. Meister et al., J. Am. Chem. Soc., 76, 4050 (1954), i.e., by fermentation with a 17α-hydroxylating microorganism such as Cephalothecium roseum. This latter compound and its 21-acylates possess known valuable therapeutic properties. The 21-acylates, moreover, are convertible to 1-dehydrohydrocortisone 21-acylates by known techniques, i.e., by reduction with lithium aluminum hydride or sodium borohydride. The latter compounds and the corresponding free alcohol, i.e., 1-dehydrohydrocortisone, possess known valuable therapeutic properties.

As disclosed above, the compound of this invention possesses valuable glucocorticoid and anti-inflammatory activity. Its pharmacological properties are especially superior to those possessed by 11-ketoprogesterone, a parent compound from which it can be made as disclosed below.

The novel compound of this invention can be produced by a fermentative 1-dehydrogenation of 11-ketoprogesterone with a fungus of the genus Septomyxa under aerobic conditions as disclosed in the copending prior application previously referred to.

As disclosed in the prior application, the operational conditions and reaction procedure and details of production can be those already known in the art of steroid bioconversion as illustrated by U.S. Patent 2,602,769, utilizing however the action of a species of fungus of the genus Septomyxa. The genus Septomyxa belongs to the class of Deuteromyces, Fungi imperfecti, of the order Melanconiales, of the family Melanconiaceae. Among the species of the genus Septomyxa which are useful in the conversion of 11-ketoprogesterone to 1-dehydro-11-ketoprogesterone are Septomyxa affinis (Sherb.) Wr., A.T.C.C. 6737, American Type Culture Collection, 2029 M Street, N.W., Washington 6, D.C., Septomyxa aesculi, Septomyxa corni, Septomyxa salicina, and Septomyxa tulasnei.

As disclosed in the prior application, culture of the fungi for the production of 1-dehydroprogesterone is in or on a medium favorable to the development of the fungi, employing conventional sources of assimilable carbon and assimilable nitrogen; and using conventional sources of mineral nutrients.

The compound of this invention can also be prepared by oxidizing 11α-hydroxy-1-dehydroprogesterone with chromic acid. The latter compound can be prepared by the fermentative 1-dehydrogenation of 11α-hydroxyprogesterone with a fungus of the genus Septomyxa under aerobic conditions as described above in connection with the 1-dehydrogenation of 11-ketoprogesterone.

The following preparation and examples are illustrative of the production of the novel compound, and are not to be construed as limiting.

PREPARATION

*11α-hydroxy-1-dehydroprogesterone*

25 liters of a medium containing one percent commercial dextrose hydrate, one percent cornsteep liquor (sixty percent solids) and tap water was adjusted to pH 5.1 by adding 49 milliliters of 25 percent sodium hydroxide solution. The entire tank system containing the medium was sterilized for a period of 35 minutes at 120 degrees centigrade. The medium was allowed to cool, and air was introduced through a sparger at the rate of 0.25 liter per minute, and the medium was agitated mechanically.

After the temperature of the medium was adjusted to between 25 degrees and 28 degrees centigrade, inoculation was carried out by introducing an isotonic saline suspension of Septomyxa affinis spores. The medium was cultured for 25 hours, at which time 5.0 grams of 11α-hydroxyprogesterone dissolved in 250 milliliters of dipropylene glycol was added, and fermentation was allowed to progress for an additional 25 hours.

At the end of the fermentation period, the beer was extracted four times with six liters of methylene chloride, and the extract washed once with water. The water wash was extracted with one liter of methylene chloride which was combined with the original extract, and the whole was dried over anhydrous sodium sulfate overnight. Papergram analysis of an aliquot sample indicated that all steroidal material contained in the extract was the desired product, namely, 11α-hydroxy-1-dehydroprogesterone.

The extract was evaporated to dryness and the residue triturated once with 25 milliliters of ether to give 3.68 grams of crude crystals (73 percent yield), M.P. 227 to 230 degrees centigrade. 3.36 grams of this crystalline product was recrystallized twice from methanol to give an overall yield of fifty percent of pure crystals of melting point 232.5 degrees to 234 degrees centigrade, $[\alpha]_D^{23}$ plus 117 degrees in chloroform (1.3186 conc.), $$\lambda_{max}^{alc.}\ 248\ m\mu,\ \epsilon\ 18{,}000$$

Infrared spectrum indicates absorption as follows: OH, 3420 cm.$^{-1}$; 20-ketone, 1699 cm.$^{-1}$; conjugated ketone, 1655 cm.$^{-1}$; $\Delta^{1,4}$-structure (C=C), 1618, 1596 cm.$^{-1}$.

*Analysis.*—Calculated for $C_{21}H_{28}O_3$: C, 76.79; H. 8.59. Found: C, 77.10; H. 8.64.

Example 1

1-dehydro-11-ketoprogesterone

One gram of 11α-hydroxy-1-dehydroprogesterone, as produced in the foregoing preparation, was oxidized by dissolving in thirty milliliters of acetic acid containing 300 milligrams of chrominum trioxide and a drop of water. The reaction mixture was allowed to stand at room temperature overnight, after which time ten milliliters of methanol was added, the reaction mixture filtered, and the filtrate evaporated to dryness in an air stream. The residue, which was crystalline, was extracted with methylene chloride, the extract washed with two percent sodium carbonate solution which was followed by a water wash and the washed filtrate dried with anhydrous sodium sulfate. The extract was evaporated to dryness and the residue crystallized from acetone. The crystals, 1-dehydro-11-ketoprogesterone, melted at 178 to 179.5 degrees centigrade. After two recrystallizations from acetone the melting point was 179 to 181 degrees centigrade.

Elementary analysis, ultraviolet, and infrared spectral analysis and optical rotation were in agreement with these constants obtained for the identical product produced in Example 2, below.

Example 2

1-dehydro-11-ketoprogesterone

Twelve liters of a medium of the following composition:

| | Percent by weight |
|---|---|
| Commercial dextrose | 1 |
| Cornsteep liquor (sixty percent solids) | 2 | was adjusted to pH 4.9 in a five-gallon stainless steel fermentor and autoclaved for one hour at fifteen pounds steam pressure. The medium was cooled and then inoculated with 600 milliliters of a 24-hour culture of *Septomyxa affinis* A.T.C.C. 6737 (grown from spores in the same type of medium). Air was sparged at the rate of 0.1 liter per minute and the medium was stirred at 200 r.p.m. After the culture had grown for seventeen hours, three grams of 11-ketoprogesterone dissolved in 75 milliliters of acetone was added, and the fermentation allowed to proceed for an additional 24 hours.

At the end of the 24-hour fermentation period, the contents of the fermentor were filtered. The filtered beer and the separated mycelium were extracted with methylene chloride and the combined extracts washed with two percent sodium bicarbonate solution followed by a water wash. The washed extract was dried with anhydrous sodium sulfate and evaporated to an oily, semicrystalline residue.

The residue was triturated with Skellysolve B hexanes. The gummy residue was taken up in ten milliliters of boiling ethyl acetate. The ethyl acetate solution was cooled to room temperature (twenty to 25 degrees centigrade), and crystallized initially by scratching the side of the container with a stirring rod. The crystals were filtered and the material recrystallized twice from ethyl acetate yielding pure 1-dehydro-11-ketoprogesterone in a total yield of thirty percent based on the 11-ketoprogesterone substrate. The compound had the following characteristics: M.P. 179 to 181 degrees centigrade, $[\alpha]_D^{20}=224$ (in $CHCl_3$, C=0.838), $$\lambda_{max.}^{alc.} 240 \, m\mu; \, K=45.69, \, \epsilon \, 14,925$$

Infrared spectrum indicates absorption as follows: ketone, 1700 $cm^{-1}$; conjugated ketone, 1665 $cm.^{-1}$; $\Delta^{1,4}$-diene, 1626 $cm.^{-1}$ and 1604 $cm.^{-1}$.

*Analysis.*—Calculated for $C_{21}H_{26}O_3$: C, 77.27; H, 8.03. Found: C, 77.50; H, 8.51.

1-dehydro-11-ketoprogesterone of this invention exhibits valuable glucocorticoid and anti-inflammatory activity and can be administered in the form of tablets, capsules, syrups and the like for oral use, in suitable suspension media for injection use and in ointments, lotions and cremes for topical use.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1,4-pregnadiene-3,11,20-trione.

References Cited in the file of this patent

UNITED STATES PATENTS

| | | |
|---|---|---|
| 2,676,181 | Hanze | Apr. 20, 1954 |
| 2,756,179 | Fried et al. | July 24, 1956 |

OTHER REFERENCES

Vischer et al.: Helv. Chim Acta, vol. 38, pages 835–40, 1955.

Nobile et al.: J.A.C.S., vol. 77, page 4184, August 5, 1955.